United States Patent
Chen

(10) Patent No.: US 6,732,356 B1
(45) Date of Patent: May 4, 2004

(54) SYSTEM AND METHOD OF USING PARTIALLY RESOLVED PREDICATES FOR ELIMINATION OF COMPARISON INSTRUCTION

(75) Inventor: William Y. Chen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,145

(22) Filed: Mar. 31, 2000

(51) Int. Cl.[7] .................................................. G06F 9/45

(52) U.S. Cl. .................. 717/156; 717/152; 717/153

(58) Field of Search .......................... 717/156, 152–153

(56) References Cited

PUBLICATIONS

Schlansker, Michael, Mahlke, Scott, Johnson, Richard, "Control CPR: A Branch Height Reduction Optimization for EPIC Architectures", Hewlettl–Packard Company 1999, retiieved from google.com on May 15, 2003.*

Schlansker, Michael, Mahlke, Scott–Hewlett–Packard & Johnson, Richard, Transmeta Corp. "Control CPR: A Branch Height Reduction Optimization for EPIC Architectures", 1999, retrieved from http://citeseer.nj.nec.com/schlansker99control.html, Sep. 26, 2002.*

* cited by examiner

*Primary Examiner*—Tuan Dam
*Assistant Examiner*—Mary Steelman
(74) *Attorney, Agent, or Firm*—Schwegman, Lundberg, Woessner & Kluth, P.A.

(57) ABSTRACT

Systems and methods are provided through which compare instructions in computer code are eliminated partially resolving the predicate of the compare instructions. Partially resolved predicates are used to reduce the number of compares generated during the prediction phase of the compiler. In a partially resolved predicate, the predicate name is defined along the same paths as the fully resolved predicate counterpart, but it can be used to guard a subset of the instructions of the fully resolved predicate name. A partially resolved predicate is generated for predicate names which are only valid in a restricted control flow region. One or more of the control flow edges are ignored when computing control dependence. The predicate name relies partially on the actual ignored control flow edge to prevent incorrect usage of the predicate name.

22 Claims, 11 Drawing Sheets

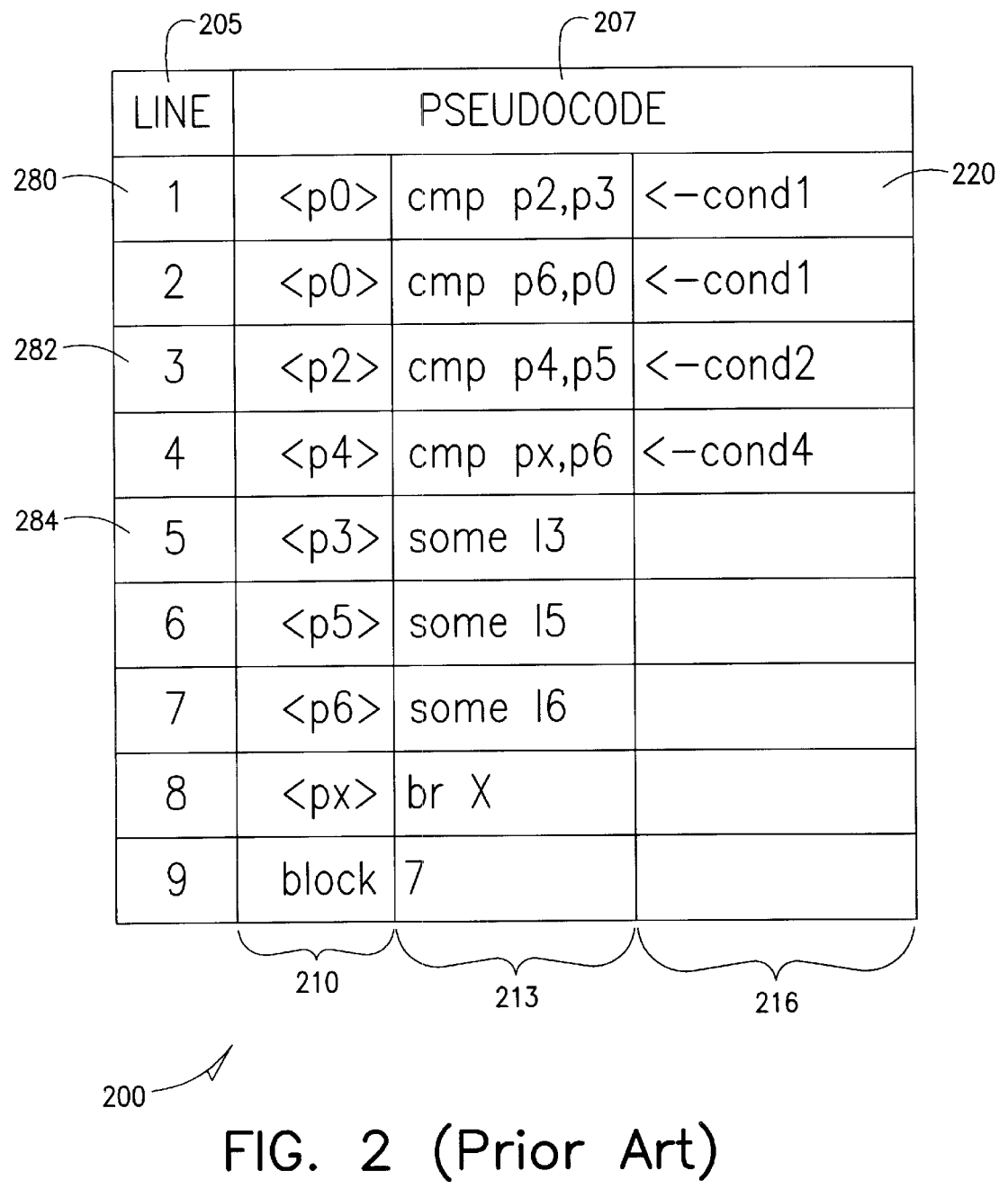

| LINE | PSEUDOCODE | | |
|---|---|---|---|
| 1 | <p0> | cmp p2,p3 | <-cond1 |
| 2 | <p0> | cmp p6,p0 | <-cond1 |
| 3 | <p2> | cmp p4,p5 | <-cond2 |
| 4 | <p4> | cmp px,p6 | <-cond4 |
| 5 | <p3> | some I3 | |
| 6 | <p5> | some I5 | |
| 7 | <p6> | some I6 | |
| 8 | <px> | br X | |
| 9 | block | 7 | |

FIG. 2 (Prior Art)

| LINE | PSEUDOCODE | | |
|---|---|---|---|
| 1 | <p0> | cmp p2,p3 | <-cond1 |
| 2 | <p2> | cmp p4,p5 | <-cond2 |
| 3 | <p4> | cmp pX,p0 | <-cond4 |
| 4 | <p3> | some I3 | |
| 5 | <p5> | some I5 | |
| 6 | <pX> | br X | |
| 7 | <p2> | some I6 | |
| 8 | block | 7 | |

FIG. 5

SYSTEM AND METHOD OF USING PARTIALLY RESOLVED PREDICATES FOR ELIMINATION OF COMPARISON INSTRUCTION

FIELD OF THE INVENTION

This invention relates generally to program source code compilation, and more particularly to eliminating compares in the prediction phase of compilation.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Intel Corporation, All Rights Reserved.

BACKGROUND OF THE INVENTION

In the compilation of program source code, after the compiler performs global optimization, comparison statements in the executable relocatable assembly-computer code are optimized in the prediction phase of compilation to reduce the number of comparison statements generated in the executable code. In conventional predication, fully resolved predicates are implemented to guard or qualify against the execution of an instruction when the data flow equation determines that the particular predicate name is defined on all paths.

Predicate execution code is generated in place of predicted branches. The predicated code is the conditional execution of an instruction under the control of a predicate. By conditionally executing all instructions in a portion of code under guard of a condition, instead of requiring change of control flow, predication effectively eliminates branches from the code. This is beneficial on wide and deep pipelines where the effect of flushes due to branch-miss predictions can cause bubbles in the execution pipeline. This results in a large opportunity cost of instructions that could have been executed. In essence, predication converts a control-dependence branch condition into a data-dependence predicate. Each microprocessor architecture accommodates a fixed number of predicate hardware registers that are used in the predication comparison. The predicate hardware registers represent the predicates that represent conditions that guard against execution of a block of code. The first predicate $P_0$ is hardwired to represent a boolean true.

To optimize comparison statements, a region of a code flow graph is selected within which the optimization is determined, or the optimization analysis is performed. To compute a fully resolved predicate for a selected flow graph region, the control dependence information in the complete flow graph is used.

BRIEF DESCRIPTION OF THE DRAWINGS

FIG. 2 is table of pseudo code representing the block diagram in FIG. 1 of computer instructions that are analyzed for compare elimination using the conventional technique of fully resolved predicates.

FIG. 5 is table of pseudo code representing the block diagram in FIG. 4 of computer instructions that are analyzed for compare elimination using techniques of the present invention of partially resolved predicates.

DETAILED DESCRIPTION OF THE INVENTION

The above-mentioned shortcomings, disadvantages and problems are addressed by the present invention, which will be understood by reading and studying the following specification.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

In the following detailed description of the embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

The detailed description is divided into six sections. In the first section, the conventional, prior art technology of fully resolving predicates in the elimination of compare instructions is described. In the second section, the hardware and the operating environment in conjunction with which embodiments of the invention may be practiced are described. In the third section, a system level overview of the invention is presented. In the fourth section, methods for an exemplary embodiment of the invention are provided. In the fifth section, a particular object-oriented Internet-based implementation of the invention is described. Finally, in the sixth section, a conclusion of the detailed description is provided.

Fully Resolved Predicates

To optimize comparison statements, a region of code or a flow graph is selected within which, the optimization is determined, or the optimization analysis is performed. To compute a fully resolved predicate for a selected flow graph region, the control dependence information in the complete flow graph is used.

Figure 1:
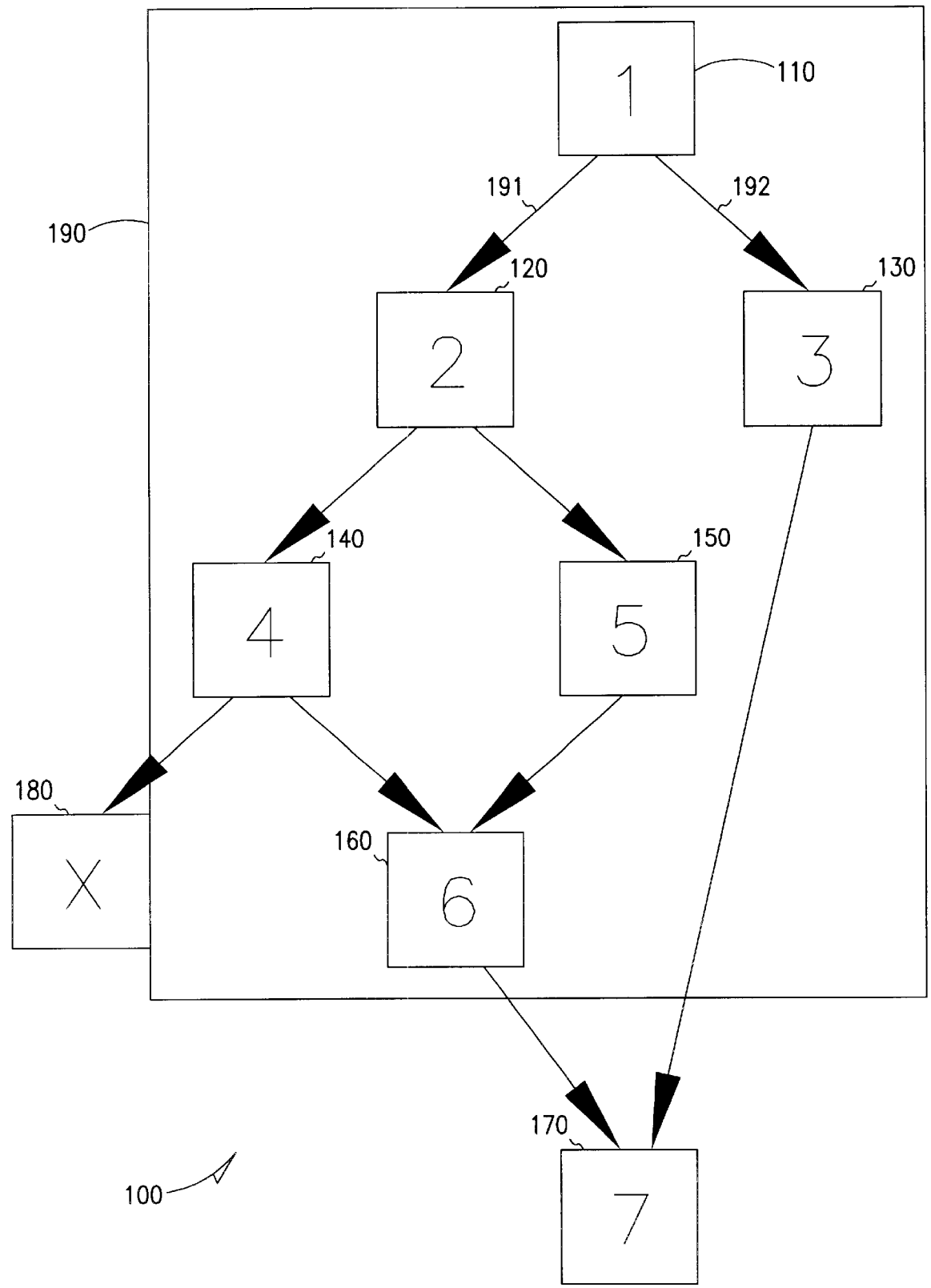
FIG. 1 is block diagram of computer instructions that are analyzed for compare elimination using the conventional technique of fully resolved predicates.

FIG. 1 is block diagram of computer instructions 100 that are analyzed for compare elimination using the conventional technique of fully resolved predicates. The computer instructions 100 are represented by a number of blocks or nodes 110, 120, 130, 140, 150, 160, 170 and 180, each node representing some computer instructions.

A region 190 is selected to compute predicates for if-conversion and code motion. In this example, node6 160 is control dependent on node1 110, node2 120, and node4 140, while it is not control dependent on node3 130, node5 150, and node7 170. Three compares are used to generate the fully resolved predicate for node6 160, one from each controlling node1, node2, and node4. The compare code sequence to fully predicate the selected region is shown in FIG. 2.

The region of analysis of predicates of computer instructions 100 is limited to a region 190. The computer instructions in the region 190, such as 110, 120, 130, 140, 150 and 160, are analyzed for compare elimination, and the computer instructions outside region 190, such as 170 and 180, are not included in the analysis for compare elimination. The flow of control is eliminated for the computer instructions outside the region of analysis 190.

The control dependence information of the region of analysis 190 is used in the computation of the fully resolved predicates. More specifically, when a first node is control dependent on a second node, the direction of flow of the second node determines or partially determines whether or not the first node is reached by control flow. For example, when node2 120 is control dependent on node1 110, the direction of flow of the node1 110 determines or partially determines whether or not node2 120 is reached by control flow. Furthermore, if the direction of flow of a first node always goes to, or never goes to, a second node, then the second node is not control dependent on the first node. Each node has a condition and at least one control flow edge leading to another node dependent on the condition. For example, node1 110 has two control flow edges, the first control edge 191 between node1 110 and node2 120 and a second control flow edge 192 between node1 110 and node3 130. Edges from the nodes follow a fixed convention, e.g. in this case, left edge is the true edge and right edge the false one. Moreover, node6 160 is control dependent on node1 110 and node4 140, while node6 160 is not control dependent on node2 120, node3 130, and node5 150.

Furthermore, each node is associated with a predicate register. These registers contain boolean values related to the condition of the node that they are dependent upon. For example, alternative registers P2 and P3 contain boolean values of the condition of node1 110. Moreover, one of the alternative predicate registers contains the value of the controlling condition, and the other register contains the negated value of the controlling condition. For example, if the condition of node1 1110 evaluates to TRUE, the predicate register P2 contains TRUE and predicate register P3 contains FALSE.

Moreover, three comparison instructions are necessary to generate the fully resolved predicate for node6 160. One comparison instruction is necessary from each controlling node1 110, node2 120 and node4 140.

FIG. 2 is a table of pseudo code 200 that represents the block diagram in FIG. 1 of computer instructions 100 that are analyzed for compare elimination using the conventional technique of fully resolved predicates. The pseudo code indicates the compare code sequence to fully predicate the selected region 190 in FIG. 1. The pseudo code is generated in a sequence to represent the computer instructions 100 in selected region 190 in FIG. 1.

Each line 205 of the pseudo code 207 includes a guarding predicate or a qualifying predicate 210, a comparison instruction 213, and a condition 216 that the execution of the comparison instruction 213 is dependent on. The condition 216 determines which comparison instruction 213 is nullified or performed. For example in line1 280, when condition1 220 is true, that indicates that predicate P2 in all later instructions is true, such as line3 282, which more specifically indicates that lines having P2 in the guarding predicate will be executed. To continue with the example of line1 280, when condition1 220 is true, that indicates that P3 is false and all instructions that have P3 in the guarding predicate, such as line5 284, will be nullified, and therefore will not be executed. Moreover, in line1, the guarding predicate P0 indicates that line1 will never be eliminated, because P0 is always true. P0 is used as the guarding predicate for line1 because line1 represents node1 110 in FIG. 1, which is the first node in the region of analysis 190 in FIG. 1, which is the entry point on the region 190 in FIG. 1, and must always be executed if any nodes in the region 190 in FIG. 1 will be executed. In reference to FIG. 1, when the condition of node1 110 is true, condition1 220 of FIG. 2 indicates that node2 120 will be executed, and node3 130 will not be executed. The effect is that the instructions guarded by P3, which are the instructions in line5 284, are never executed when the condition of node1 110 in FIG. 1 is true.

Hardware and Operating Environment

Figure 3:
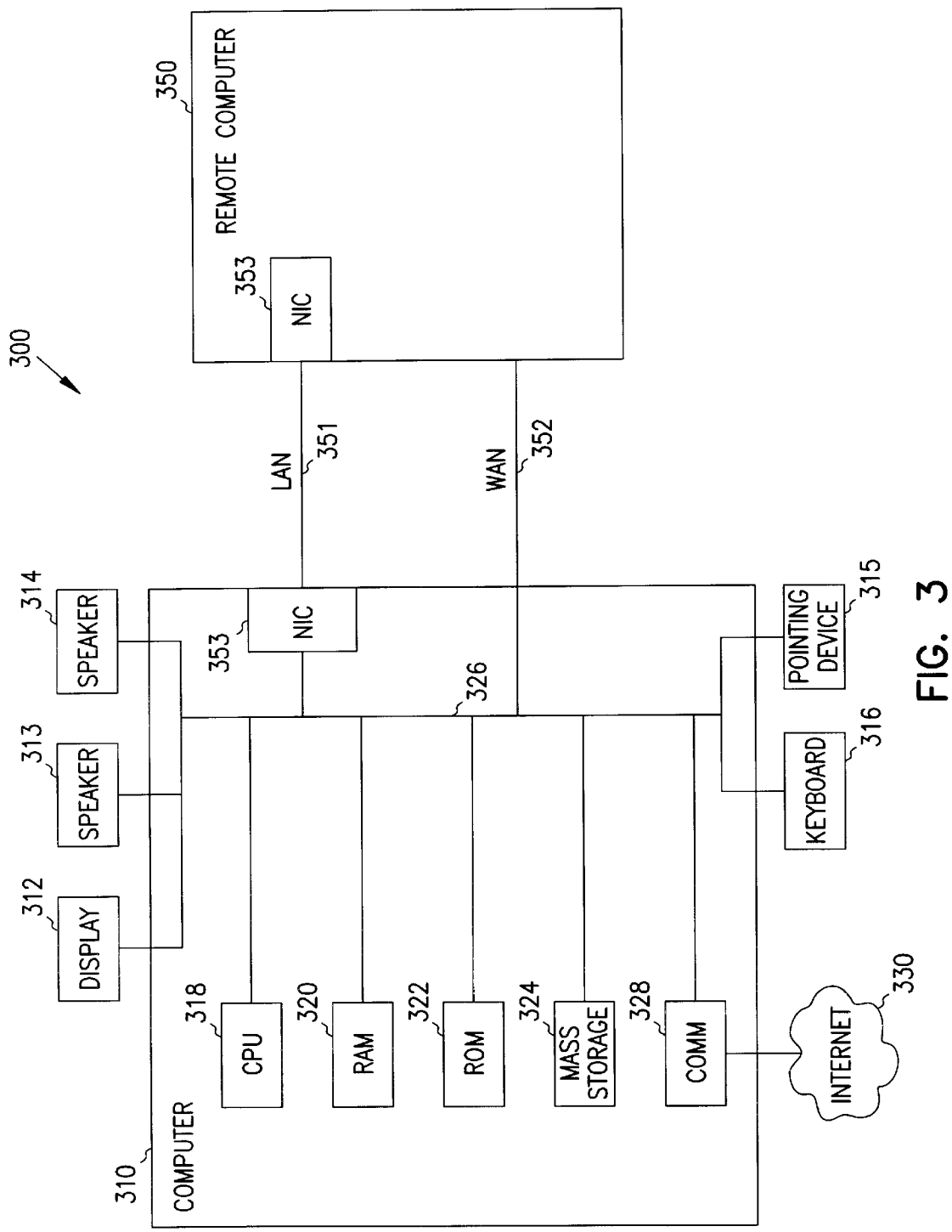
FIG. 3 is a block diagram of the hardware and operating environment in which different embodiments of the invention can be practiced.

FIG. 3 is a block diagram of the hardware and operating environment 300 in which different embodiments of the invention can be practiced. The description of FIG. 3 provides an overview of a computer hardware and a suitable computing environment in conjunction with which embodiments of the present invention can be implemented. Embodiments of the present invention are described in terms of a computer executing computer-executable instructions. However, embodiments of the present invention can be implemented entirely in computer hardware in which the computer-executable instructions are implemented in read-only memory. An exemplary embodiment of the invention can also be implemented in client/server computing environments where remote devices that are linked through a communications network perform tasks. Program modules can be located in both local and remote memory storage devices in a distributed computing environment.

Computer 310 is operatively coupled to display device 312, pointing device 315, and keyboard 316. Computer 310 includes a processor 318, commercially available from Intel Corporation, random-access memory 320 (RAM), read-only memory 322 (ROM), one or more mass storage devices 324, and a system bus 326 that operatively couples various system components, including the system memory, to the processing unit 318. Mass storage devices 324 are more specifically types of nonvolatile storage media and can include a hard disk drive, a floppy disk drive, an optical disk drive, and a tape cartridge drive. The memory 320, 322, and mass storage devices 324, are types of computer-readable media. A user enters commands and information into the computer 310 through input devices such as a pointing device 315 and a keyboard 316. Other input devices (not shown) can include a microphone, joystick, game pad, satellite dish, scanner, or the like. The processor 318 executes computer programs stored on the computer-readable media. Embodiments of the present invention are not limited to any type of computer 310. In varying embodiments, computer 310 comprises a PC-compatible computer, a MacOS-compatible computer or a UNIX-compatible computer. The construction and operation of such computers are well known within the art.

Furthermore, computer 310 can be communicatively connected to the Internet 330 via a communication device 328. Internet 330 connectivity is well known within the art. In one embodiment, a communication device 328 is a modem that responds to communication drivers to connect to the Internet via what is known in the art as a "dial-up connection." In another embodiment, a communication device 328 is an Ethernet or similar hardware (network) card connected to a local-area network (LAN) that itself is connected to the Internet via what is known in the art as a "direct connection" (e.g., T1 line, etc.).

Computer 310 also has at least one operating environment running thereon, each desirably providing a graphical user interface including a user-controllable pointer. Such operating environments include operating systems such as versions of the Windows® from Microsoft Corporation and MacOS® from Apple Corporation, operating systems well-known in the art. Embodiments of the present invention are not limited to any particular operating environment, however, and the construction and use of such operating environments are well known within the art. Computer 310 also desirably can have at least one web browser application program running within at least one operating environment, to permit users of computer 310 to access intranet or Internet world-wide-web pages as addressed by Universal Resource Locator (URL) addresses. Such browser application programs include Netscape Navigator® and Microsoft® Internet Explorer.

Display device 312 permits the display of information, including computer, video and other information, for viewing by a user of the computer. Embodiments of the present invention are not limited to any particular display device 312. Such display devices include cathode ray tube (CRT) displays (monitors), as well as flat panel displays such as liquid crystal displays (LCDs). Display device 312 is connected to the system bus 326. In addition to a monitor, computers typically include other peripheral output devices such as printers (not shown), speakers, pointing devices and a keyboard 313 and 314 enable the audio output of signals. Speakers 313 and 314 are also connected to the system bus 326. Pointing device 315 permits the control of the screen pointer provided by the graphical user interface (GUI) of operating systems such as versions of Windows® from Microsoft Corporation. Embodiments of the present invention are not limited to any particular pointing device 315. Such pointing devices include mouses, touch pads, trackballs, remote controls and point sticks. Finally, keyboard 316 permits entry of textual information into computer 310, as known within the art; embodiments of the present invention are not limited to any particular type of keyboard.

The computer 310 can operate in a networked environment using logical connections to one or more remote computers, such as remote computer 350. These logical connections are achieved by a communication device coupled to, or a part of, the computer 310; embodiments of the present invention are not limited to a particular type of communications device. The remote computer 350 can be another computer, a server, a router, a network PC, a client, a peer device or other common network node. The logical connections depicted in FIG. 3 include a local-area network (LAN) 351 and a wide-area network (WAN) 352. Such networking environments are commonplace in offices, enterprise-wide computer networks, intranets and the Internet.

When used in a LAN-networking environment, the computer 310 and remote computer 350 are connected to the local network 351 through a network interface or adapter 353, which is one type of communications device. When used in a conventional WAN-networking environment, the computer 310 and remote computer 350 communicate with a WAN 352 through modems (not shown). The modem, which can be internal or external, is connected to the system bus 326. In a networked environment, program modules depicted relative to the computer 310, or portions thereof, can be stored in the remote memory storage device.

System Level Overview

Figure 4:
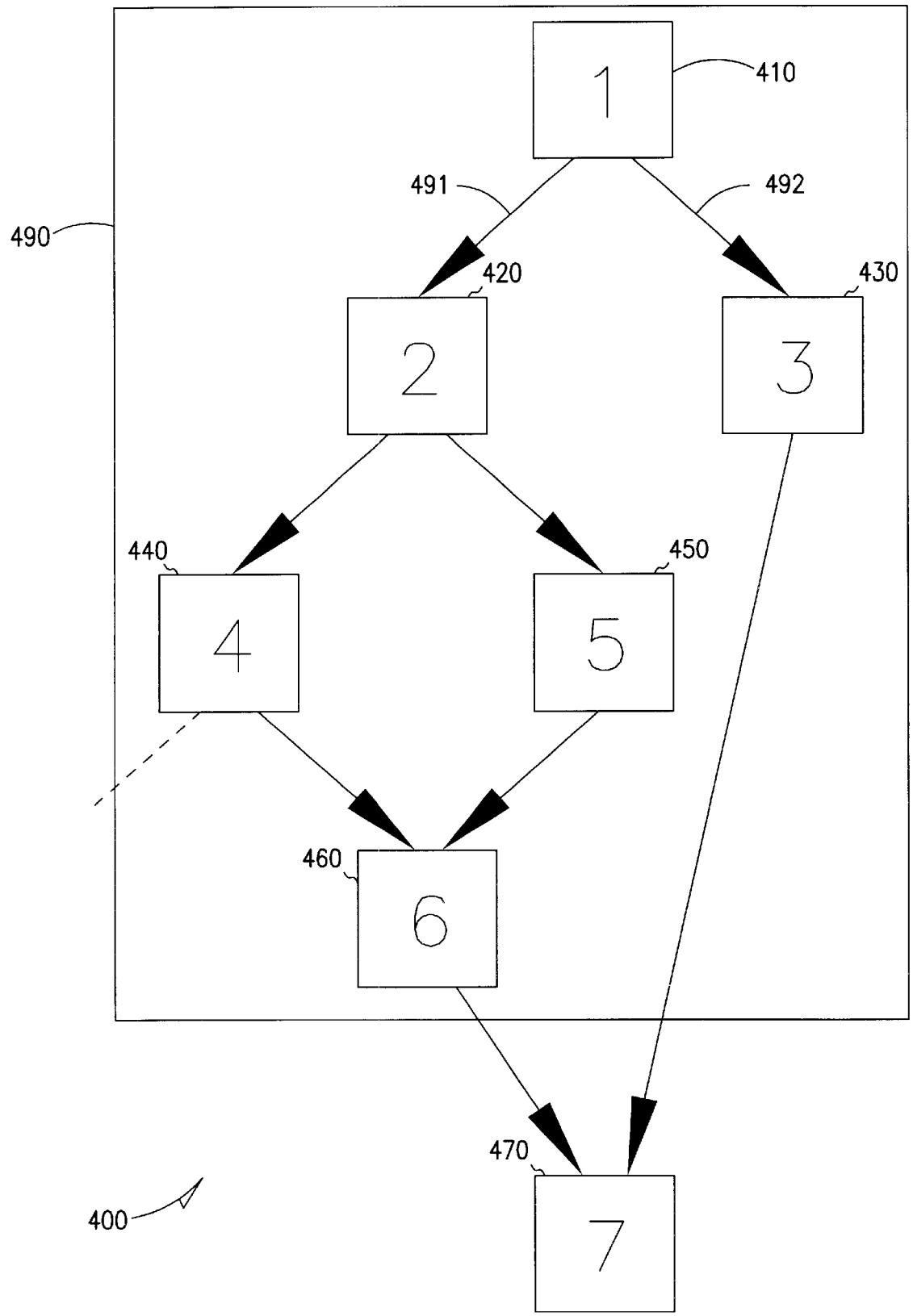
FIG. 4 is block diagram of computer instructions that are analyzed for compare elimination using techniques of the present invention of partially resolved predicates.

FIG. 4 is a block diagram that provides a system level overview of the operation of embodiments of the present invention. The concepts of an exemplary embodiment of the invention are described as operating in a multi-processing, multi-threaded operating environment on a computer, such as computer 310 in FIG. 3.

Partially resolved predicates enable a compiler to reduce the number of compare instructions generated. Removing these compare instructions reduces critical path length and uses less functional units.

To generate partially resolved predicates, the modified graph, or the selected region excluding the selected exiting flow edge(s), is used to compute control dependence and equivalence information. A pseudo predicate name assignment is performed to determine the reuse of predicate names. Compares are generated for the selected region. The predicate names which have been optimized are restricted to be used below the conditional branch whose edge was removed during graph modification.

To optimize comparison statements, a region of code of a flow graph is selected within which the optimization is determined, or within which the optimization analysis is performed. To compute a partially resolved predicate for a selected flow graph region, the control dependence information in the complete flow graph is used.

FIG. 4 is block diagram of computer instructions 400 that are analyzed for compare elimination using the conventional technique of partially resolved predicates. The computer instructions 400 are represented by a number of blocks or nodes 410, 420, 430, 440, 450, 460, and 470, each node representing some computer instructions.

The region of analysis of predicates of computer instructions 400 is limited to a region 490. The computer instructions in the region 490, such as 410, 420, 430, 440, 450 and 460, are analyzed for compare elimination. The computer instructions outside region 490, such as 470, are not included in the analysis for compare elimination. In other words, the flow of control is eliminated for the computer instructions outside the region of analysis 490.

The control dependence information of the region of analysis 490 is used in the computation of the partially resolved predicates. More specifically, when a first node is control dependent on a second node, the direction of flow of the second node determines or partially determines whether or not the first node is reached by control flow. For example, when node2 420 is control dependent on node1 410, the direction of flow of the node1 410 determines or partially determines whether or not node2 420 is reached by control flow. Each node has a condition and at least one control flow edge leading to another node dependent on the condition. For example, node1 410 has two control flow edges, the first control edge 491 between node1 410 and node2 420 and a second control flow edge 492 between node1 410 and node3 430. Moreover, node6 460 is control dependent on node1 410, node2 420 and node3 430, while node6 460 is not control dependent on node3 430, node4 440 and node5 450.

Furthermore, each node is associated with a predicate register. For example, node1 410 is associated with predicate register $P_0$, node2 420 is associated with predicate register $P_2$, and node3 430 is associated with predicate register $P_3$. Registers contain boolean values related to the condition of the node that they are dependent upon. For example, registers P2 and P3 contain boolean values of the condition of node1 410. Moreover, one of the predicate registers contains the value of the controlling condition, and the other register will contain the negated value of the controlling condition. For example, if the condition of node1 410 evaluates to TRUE, the predicate register P2 contains TRUE and predicate register P3 contains FALSE.

Moreover, no compare instructions are necessary to generate the partially resolved predicate for node6 460 because node2 420 and node6 460 share the same predicate register, which is the predicate computed for node2 420. The predicate for node2 420 is used, and is valid for node6 460 after the branch in 440. The partially resolved predicate for node6 460 uses the fully resolved predicate for node2 420. One comparison instruction is necessary from each controlling node1 410, node2 420 and node4 440.

Figure 5:
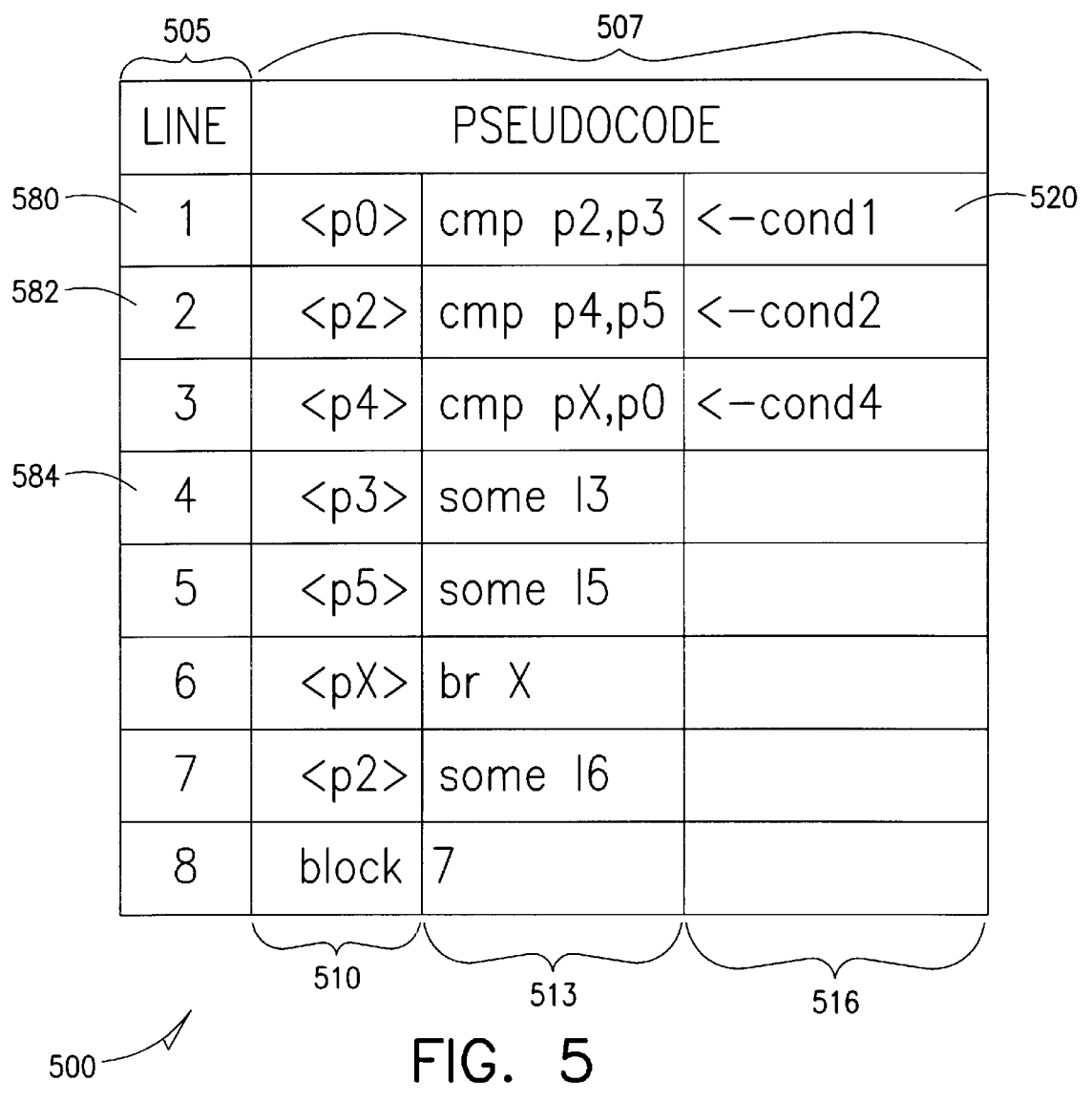

FIG. 5 is a table of pseudo code 500 that represents the block diagram in FIG. 4 of computer instructions 400 that are analyzed for compare elimination using the conventional technique of partially resolved predicates. The pseudo code indicates the compare code sequence to partially predicate the selected region 490 in FIG. 4. The pseudo code is generated in a sequence to represent the computer instructions 400 in selected region 490 in FIG. 4.

Each line 505 of the pseudo code 507 includes a guarding predicate 510, a comparison instruction 513, and a condition 516 that the execution of the comparison instruction 513 is dependent on. The condition 516 determines which comparison instruction 513 is nullified or performed. For example in line1 580, when condition1 520 is true, that indicates that predicate P2 in all later instructions is true, such as at line2 582, which more specifically indicates that lines having P2 in the guarding predicate will be executed. To continue with the example of line1 580, when condition1 520 is true, that indicates that P3 is false; and all instructions that have P3 in the guarding predicate, such as line4 584, will be nullified, and therefore will not be executed. Moreover, in line1, the guarding predicate P0 indicates that line1 will never be eliminated, because P0 is always true. P0 is used as the guarding predicate for line1 because line1 represents node1 410 in FIG. 4, which is the first node in the region of analysis 490 in FIG. 4, which is the entry point on the region 490 in FIG. 4, and must always be executed if any nodes in the region 490 in FIG. 4 will be executed. In reference to FIG. 4, when the condition of node1 410 is true, condition1 520 of FIG. 5 indicates that node2 420 will be executed, and node3 430 will not be executed. The effect is that the instructions guarded or qualified by P3, which are the instructions in line4 584, are never executed when the condition of node1 410 in FIG. 4 is true.

The system level overview of the operation of an exemplary embodiment of the invention has been described in this section of the detailed description. The present invention partially resolves predicates in the elimination of comparison instructions.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Methods 600–1200 are performed by a client program executing on, or performed by, firmware or hardware that is a part of, a computer, such as computer 310 in FIG.3. Methods 600–1000 are illustrated by the pseudo code in Table 1 as follows:

TABLE 1

```
For each region ( r )
// Phase 1 : fully resolved predicate name assignment
For each block ( b ) in r
    Compute dominator ( b )
    Compute post-dominator ( b )
For each block ( b ) in r
    Idom = immediate dominator ( b )
    Ipdom = immediate post-dominator ( Idom )
    If ( Ipdom == b )
        Mark Control Dependence Equivalent ( Idom b ) to Cdequiv-list ( b )
        and Cdequiv-list ( Idom )
// Predicate assignment loop.
For each block ( b ) in r
    If ( predicate name not assigned ( b ) )
        Assign new predicate name ( b )
        For each Control Dependence Equivalent block ( equiv ) of b
            Predicate name ( equiv ) = Predicate name ( b )
// Phase 2 : partially resolved predicate name assignment
For each r exit ( xt )
    If ( side exit ( xt ) )
        Remove xt from region flow graph
```

TABLE 1-continued

```
For each block ( b ) in r
    Compute dominator ( b )
    Compute post-dominator ( b )
For each block ( b ) in r
    Idom = immediate dominator ( b )
    Ipdom = immediate post-dominator ( Idom )
    If ( Ipdom == b )
        Mark pseudo control dependence equivalent ( Idom b ) to
        pCdequiv-list ( b ) and pCdequiv-list (Idom)
// phase 3. compare the list of candidates to fully resolved predicate names
For each block ( b ) in r
    If ( Cdequiv-list ( b ) not equal pCdequiv-list ( b ) )
        Candidate-list = pCdequiv-list ( b ) - Cdequiv-list ( b )
        Icdequiv = immediate CD Equivalent block of b ( Candidate-list )
        Partially resolved predicate name alias ( b ) = predicate name
        ( Icdequiv )
        Insert b in partial-predicate-list
// Phase 4. determine which candidates to keep
For each block ( b ) in partial-predicate-list
    If ( profitable ( b ) )
        Insert pseudo instruction pcopy predicate name ( b ) = Partially
        resolved predicate name alias ( b )
        For each immediate predecessor region exit ( ixt )
            Insert dependence edge from branch for ixt to pcopy
        For each controlling block ( cb ) of b
            Delete compare generation for predicate name ( b )
Restore original flow graph ( r )
```

Figure 6:
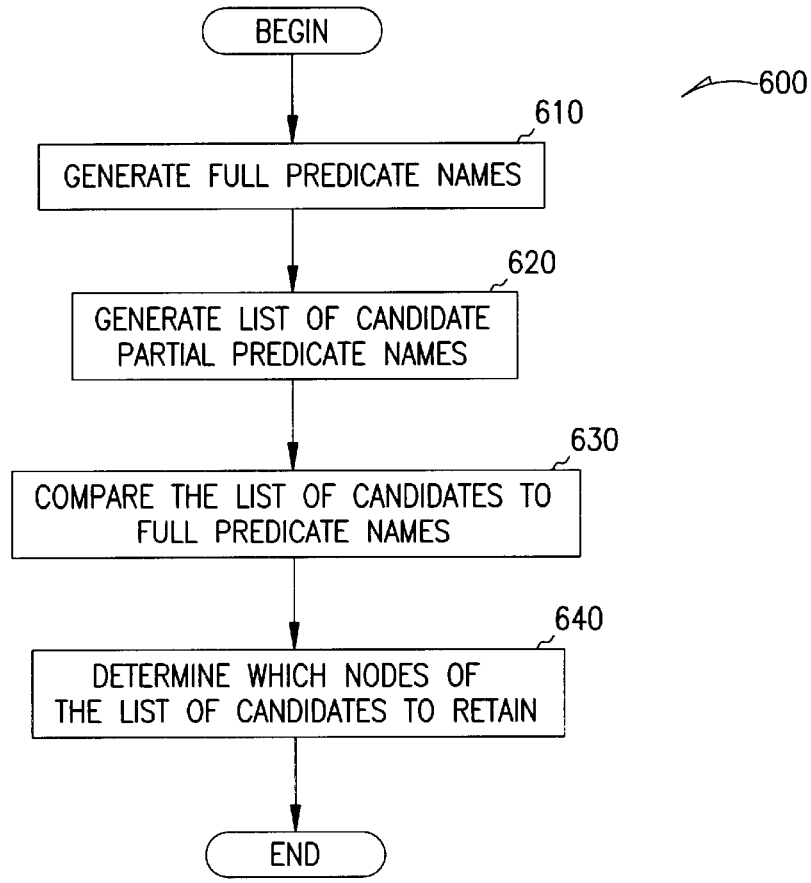
FIG. 6 is a flowchart of a method 600 of the present invention.

FIG. 6 is a flowchart of a method 600 performed by a client according to an exemplary embodiment of the invention.

Method 600 is a computerized method for optimizing computer instructions by eliminating computer comparison instructions within a region flow graph of computer instructions using partially resolved predicates. Method 600 includes generating a fully resolved predicate name of each node of the region flow graph 610. The fully resolved predicate name is computed because a predicate name is assigned to every node in the region flow graph with the flow edges intact. The fully resolved predicate name is computed also because some nodes within the region flow graph can share the same name because of the possible equivalence of nodes. This allows edges to be ignored, because some nodes can be made, or represented as, equivalent. Action 610 corresponds to Phase 1 in the pseudo code of Table 1. In one embodiment, generating fully resolved predicate names includes computing or determining control dependence equivalence information of each node and assigning or associating a virtual predicate name to each node, wherein each control dependence equivalent (CDE) node shares the same name. A control dependence is a constraint that arises from the control flow of the program. Two nodes are control dependence equivalent when the two nodes have the same control dependence characteristics. Any methods of generating fully resolved predicate name that are well-known to those skilled in the art can be used in action 610. In another embodiment, computing or determining control dependence equivalence information includes, for each node in the region, computing or determining a dominator. A dominator exists where a first node dominates a second node because every possible execution path from entry to the second node includes the first node. In another embodiment, method 600 includes computing or determining a post-dominator. A post-dominator exists where a first node postdominates a second node, because every possible execution path from the second node to exit includes the first node. In yet another embodiment, method 600 includes computing or determining an immediate dominator. An immediate dominator is a dominator that is closest to the node at issue. In still another embodiment, method 600 includes computing or determining a immediate post-dominator. An immediate post-dominator is the post-dominator that is closest to the node at issue. In still yet another embodiment, method 600 includes marking a CDE using the immediate dominator of the node to a CDE list of the node when the immediate post-dominator equals the node address, and marking a CDE using the immediate dominator of the node to a CDE list of the immediate dominator of the node when the immediate post-dominator equals the node address. In yet another embodiment, assigning or associating a virtual predicate name to each node includes assigning or associating a predicate name to the node for each node not having a predicate name, and assigning or associating the predicate name of the node to a predicate name of the CDE of each CDE node for each node not having a predicate name.

Method 600 also includes generating a list of candidates of nodes to ignore 620. In one embodiment, generating a fully resolved predicate name 610 is performed after generating a list of candidates of nodes to ignore 620. Action 620 corresponds to Phase 2 in the pseudo code of Table 1.

Thereafter, method 600 includes comparing the list of candidates to each node having a fully resolved predicate name 630. Action 630 creates a list of partially resolved predicate name aliases based on the differences between CDE and pseudo CDE. Action 630 corresponds to Phase 3 in the pseudo code in Table 1.

Subsequently, method 600 includes computing or determining which nodes of the list of candidates to retain using the list of partially resolved predicate name aliases generated in action 630. Action 640 corresponds to Phase 4 in the pseudo code of Table 1.

In one embodiment of action 640, computing or determining which nodes to retain involves stepping through the list of partially resolved predicate name aliases computed, generated or created in action 630, thereby computing or determining which nodes in the region graph are profitable. In one embodiment, computing or determining profitability is performed by means of a heuristic cost function, where various input conditions are given, and a metric is returned indicating whether the decision is a good one or a bad one. Determining profitability is analogous to stock market performance picking, where an analyst decides based on certain market conditions to buy stock in a company or not.

If a node is profitable, then a pseudo copy is inserted to indicate that the pseudo CDE condition exists for the virtual predicate name, and that it cannot break the rules associated with taking the new partially resolved name instead of the fully resolved name. Finally, the real instruction, the unnecessary compare instruction which generates the partially resolved predicate, is removed, which generates the fully resolved name, and results in a performance improvement.

Figure 7:
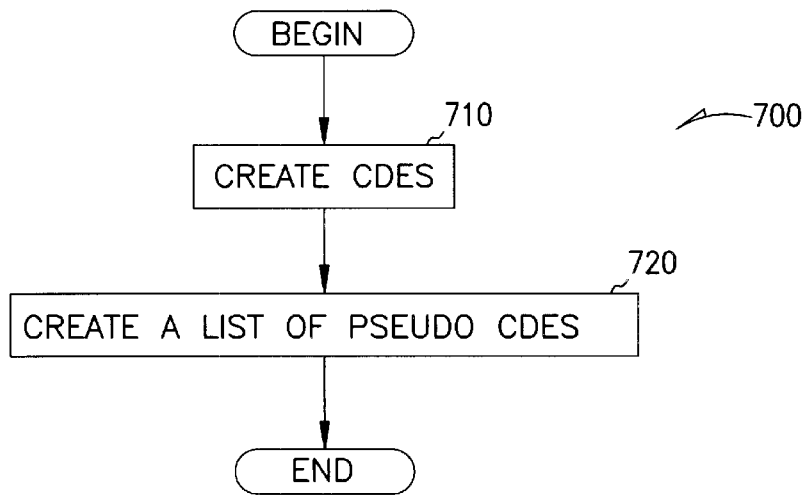
FIG. 7 is a flowchart of a method of generating a list of candidates of nodes to ignore as in action 620 in FIG. 6.

FIG. 7 is a flowchart of a method 700 of one embodiment of generating a list of candidates of nodes to ignore as in action 620 in FIG. 6.

Method 700 includes creating CDEs by removing side exits from the region 710. Side exits are the region nodes in a physical layout of the control flow graph containing branches that provide a decision to branch to a node outside of the region or fall through to within the region. In one embodiment, creating CDEs includes removing the variable denoting the exiting node from the region flow graph where a side exit of the region flow graph exists for each region exit of the region flow graph. A region exit and all control flow from the nodes within the region to nodes outside the region are region exits. Method 700 also includes creating a list of pseudo CDEs 720.

Figure 8:
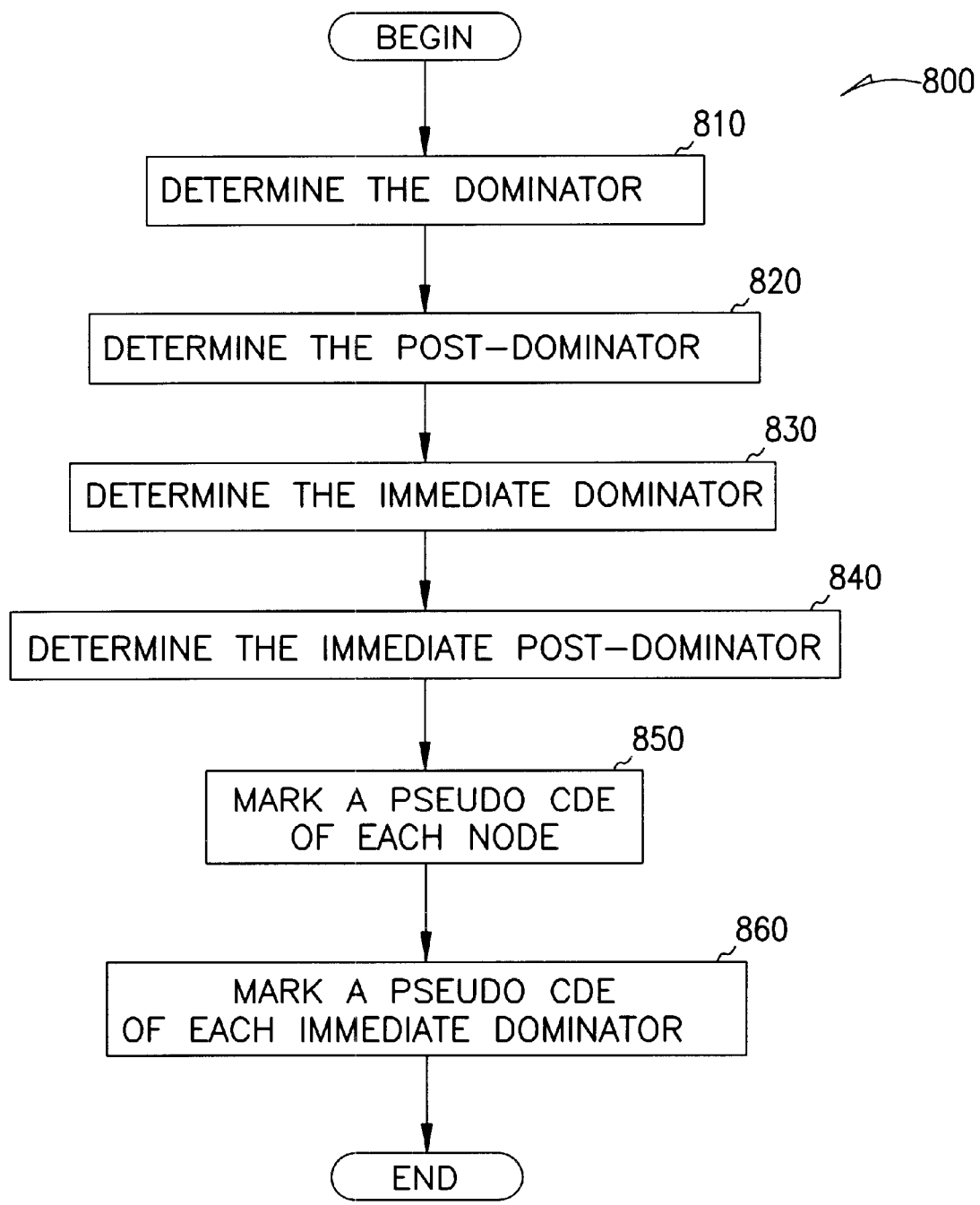
FIG. 8 is a flowchart of a method of creating pseudo control dependence equivalents as in action 720 in FIG. 7.

FIG. 8 is a flowchart of a method 800 of one embodiment of creating pseudo CDEs as in action 720 in FIG. 7.

Method 800 includes computing or determining the dominator for each node in the region flow graph 810, computing or determining the post-dominator for each node in the region flow graph 820, computing or determining an immediate dominator for each node in the region flow graph 830, and computing or determining a immediate post-dominator for each node in the region flow graph 840. Actions 810, 820, 830 and 840 can be performed in any order relative to each other. Thereafter, method 800 of creating pseudo CDEs includes marking a pseudo CDE of each node in the region when the immediate post-dominator equals the node address, at 850. The pseudo CDE is marked using the immediate dominator generated in action 830. In one embodiment, the pseudo CDE is located in the list of pseudo CDEs at 850. Thereafter, immediate predecessor region exit 800 of creating pseudo CDEs includes marking a pseudo CDE of each immediate dominator in the region when the immediate post-dominator equals the node address 860. The pseudo CDE is marked using the immediate dominator, generated in action 830. In one embodiment, the pseudo CDE is located in the list of pseudo CDEs.

Figure 9:
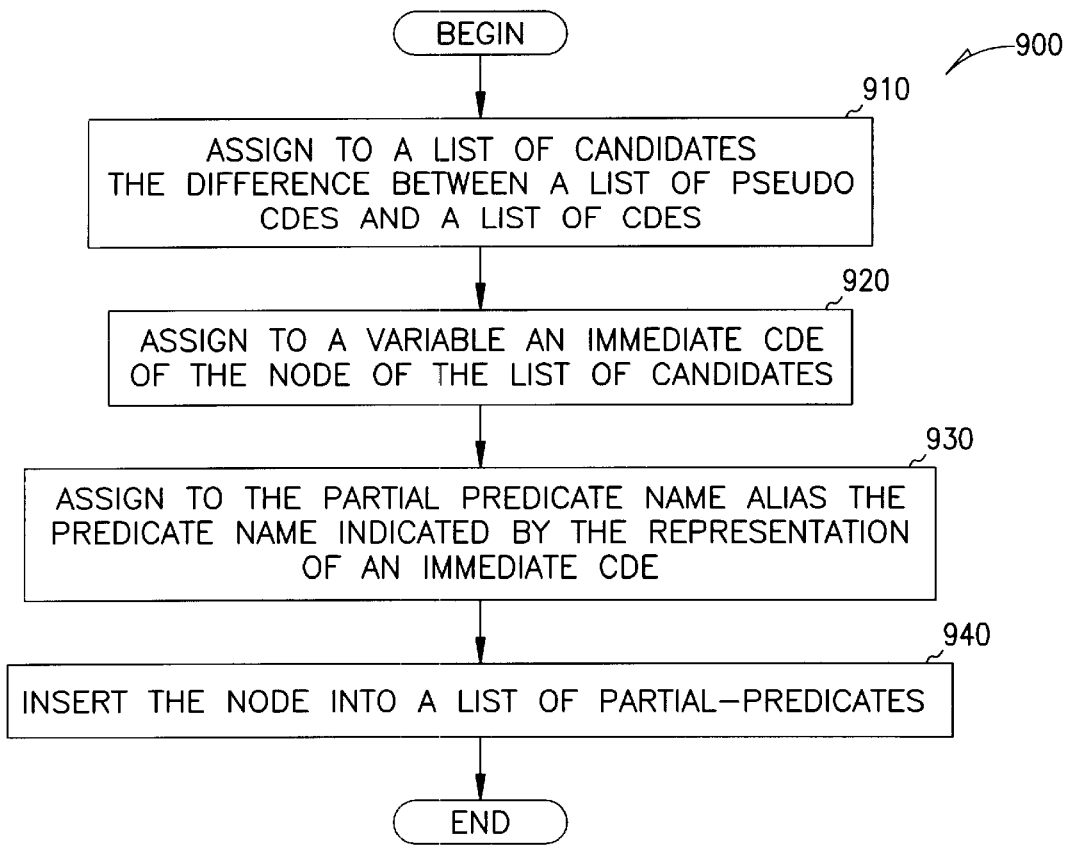
FIG. 9 is a flowchart of a method of comparing the list of candidates to each node having a fully resolved predicate name as in action 630 in FIG. 6.

FIG. 9 is a flowchart of a method 900 of one embodiment of comparing the list of candidates to each node having a fully resolved predicate name as in action 630 in FIG. 6. In this method the difference between CDE and pseudo CDE is compared. A list of partially resolved predicate name aliases is generated based on the differences between CDE and pseudo CDE. More specifically, two nodes that are not CDE, but are associated with the region exit(s) are removed in action 710 in FIG. 7, thereby making the two nodes pseudo CDE. Therefore, the virtual predicate name that was generated in action 610 in FIG. 6 can now be shared, but in a restricted sense.

Method 900 includes assigning to, or associating with, the list of candidates for partially resolved predicates, the difference(s) between a list of pseudo CDEs and a list of CDEs 910. Method 900 also includes assigning or associating a variable representation of an immediate CDE of the node of the list of candidates 920. Method 900 further includes assigning or associating the partially resolved predicate name alias indicated by the node to the predicate name indicated by the representation of an immediate CDE 930. Lastly, method 900 includes inserting the node into a list of partially resolved predicates 940. The order of performing actions 930 and 940 can be interchanged or performed simultaneously.

Figure 10:
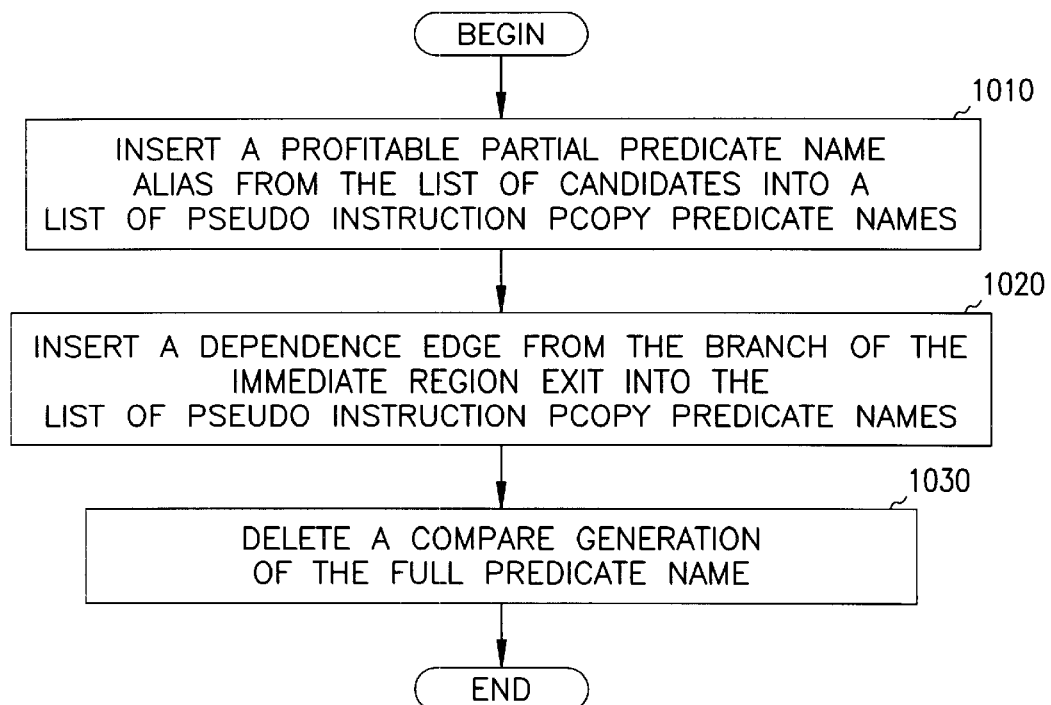
FIG. 10 is a flowchart of a method of computing or determining which node of the list of candidates to retain as in action 640 in FIG. 6.

FIG. 10 is a flowchart of a method 1000 of one embodiment of computing or determining which node of the list of candidates to retain as in action 640 in FIG. 6.

Method 1000 includes inserting a partially resolved predicate name alias indicated by the node into a list of pseudo instruction pseudo copy predicate names indexed by the node 1010. Method 1000 also includes inserting a dependence edge from the branch for an immediate predecessor region exit to the list of pseudo instruction pseudo copy predicate names indexed by the node, for each immediate predecessor region exit 1020. The immediate predecessor region exit refers to the branch that is closest to the node in question, which determines, by being taken or not taken, whether the node is executed or not. The immediate predecessor region exit is the immediate node that the node in question is control dependent on. Inserting the pseudo copy yields the full name of the node associated with the partially resolved predicate name alias.

Lastly, method 1000 includes deleting generation of a compare instruction for the partially resolved predicate name alias indexed by the node for each controlling node of the node 1030. In another embodiment, method 1000 includes restoring the original region flow graph.

Figure 11:
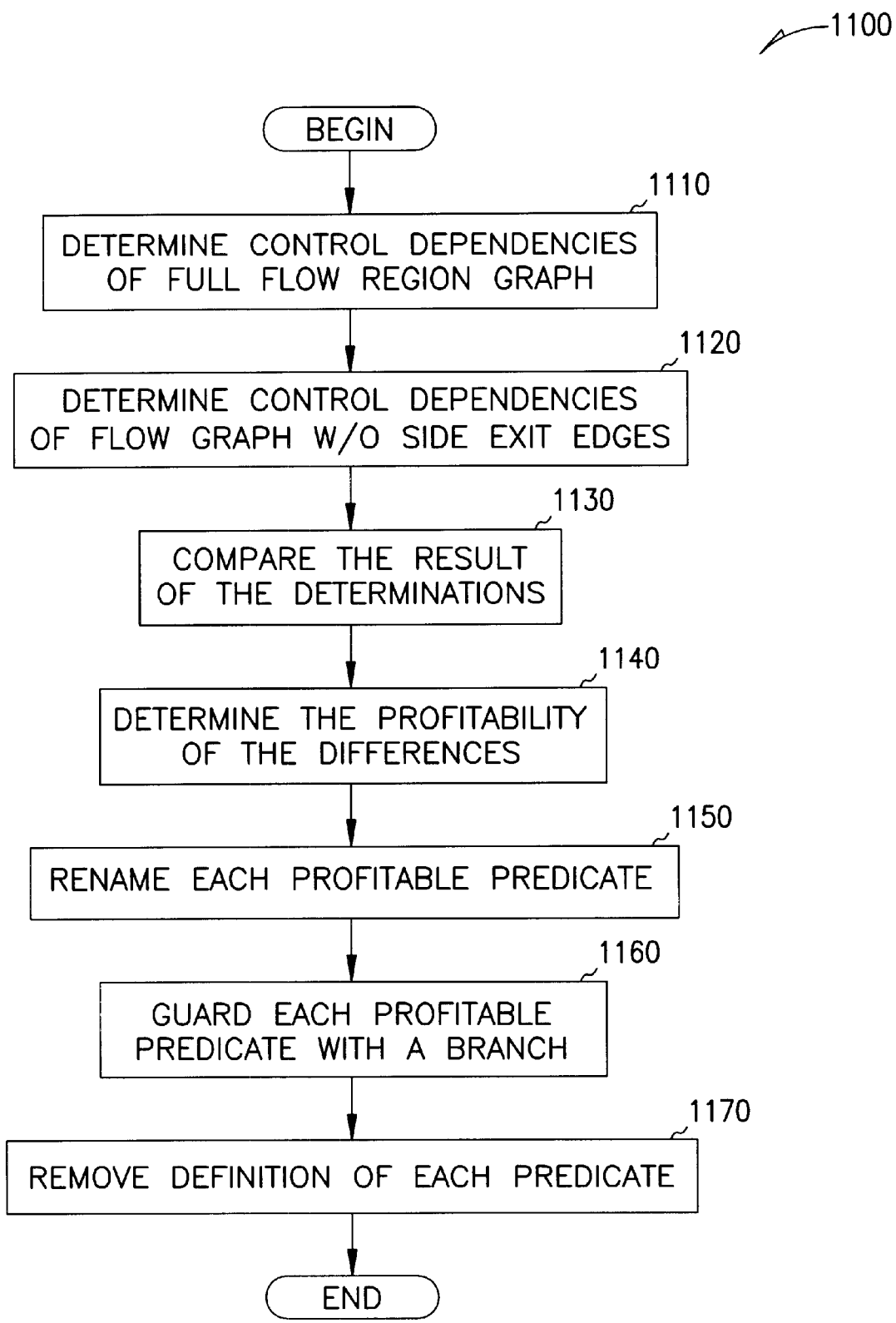
FIG. 11 is a flowchart of a method of optimizing computer comparison instructions by partially resolving predicates.

FIG. 11 is a flowchart of a method 1100 of optimizing computer comparison instructions by partially resolving predicates. Method 1100 ignores all edges and finds the profitable edges to retain.

Method 1100 includes computing or determining control dependencies based on a full flow region graph of nodes of computer instructions 1110, in which a full CDE is generated. The method also includes determining control dependencies of the nodes based on a flow graph without any side exit edges 1120. More specifically, a pseudo CDE is generated. The method further includes comparing the result of the determinations 1130, resulting in a plurality of differences in control dependencies. More specifically, the full CDE is compared to the pseudo CDE. Thereafter, method 1100 determines the profitability of each of the differences 1140. Subsequently, method 1100, includes renaming each profitable predicate 1150 in which a pseudo copy is generated, guarding or qualifying each profitable predicate with a branch 1160, and finally, removing the definition of each predicate 1170, resulting in a set of computer instructions in which the compare instruction are optimized. Depending upon the location of the predicate name, the predicate name can become either the fully resolved predicate name or the partially resolved predicate name alias. The node subsequent in the control flow graph to the pseudo copy name alias node is the partially resolved predicate name alias, and the node prior to the pseudo copy name alias is the fully resolved predicate name.

Implementation

In this section of the detailed description, particular implementations of the invention are described in conjunction with the methods described in conjunction with FIGS. 6–11.

Figure 12:
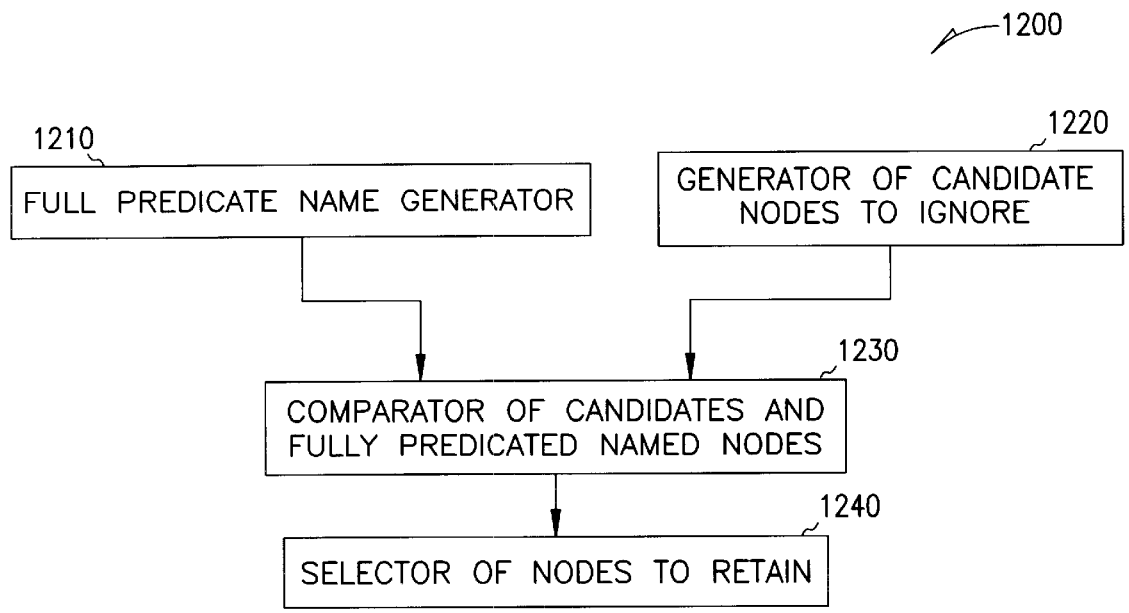
FIG. 12 is a block diagram of a system for optimizing computer instructions by eliminating computer comparison instructions within a region flow graph of computer instructions using partially resolved predicates.
Figure 13:
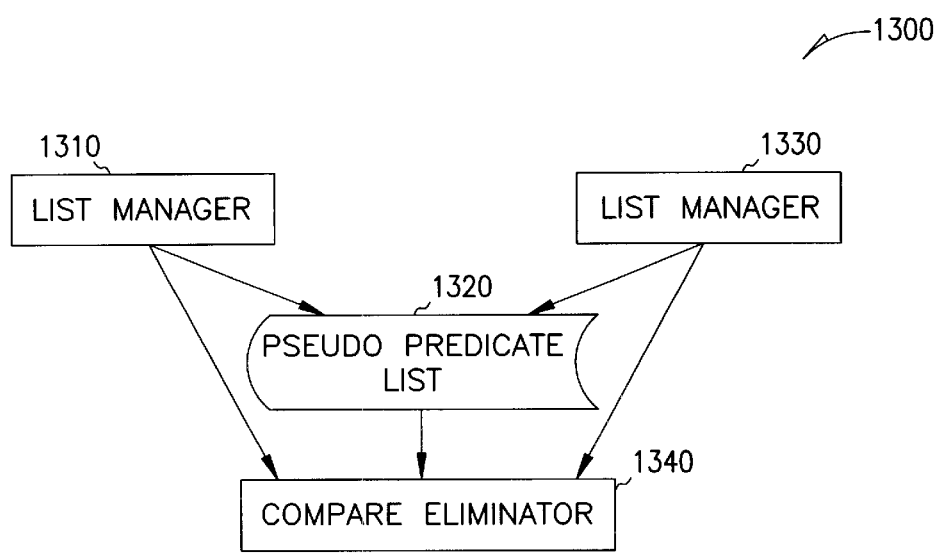
FIG. 13 is block diagram of the selector 1240 of FIG. 12.
Figure 14:
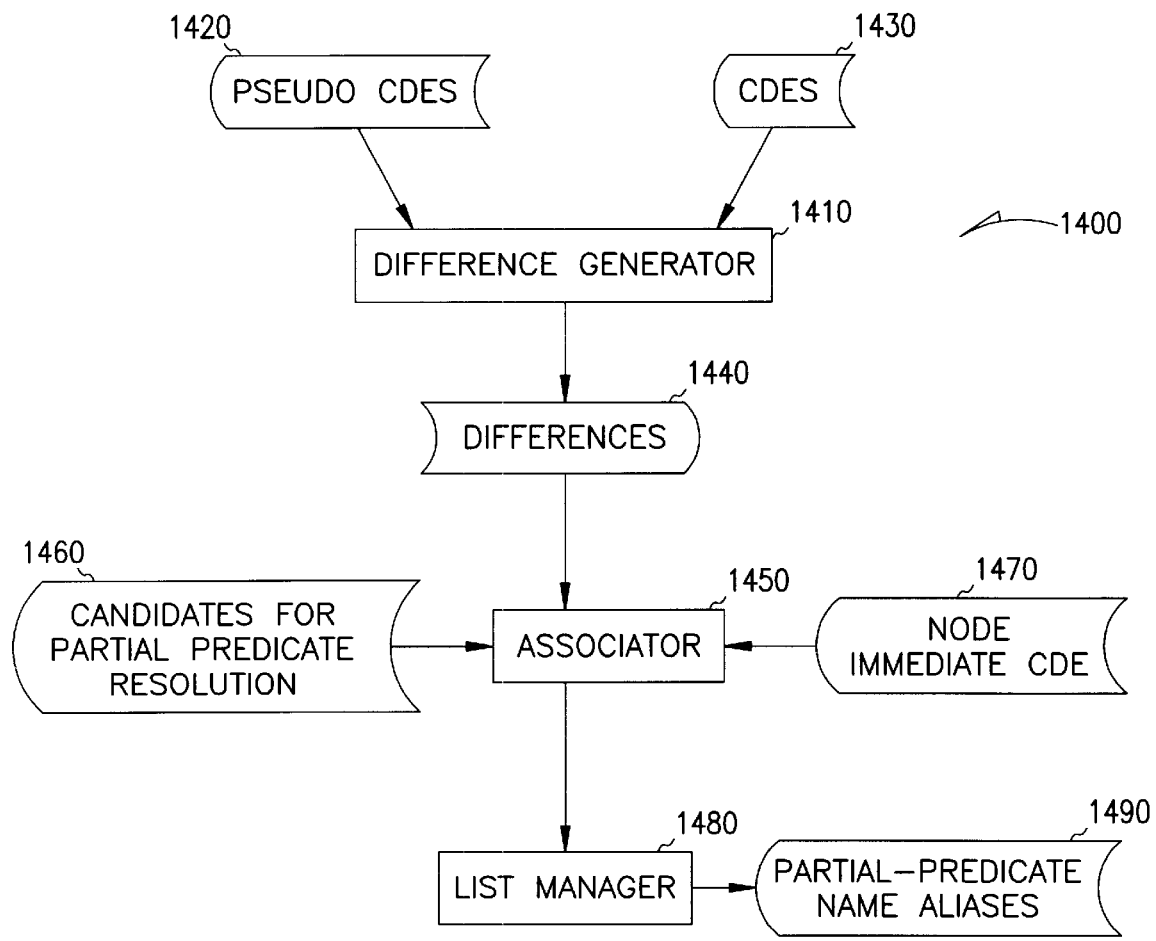
FIG. 14 is a block diagram of an embodiment of the comparator 1230 of FIG. 12.

System 1200 in FIG. 12 is a computerized system for optimizing computer instructions by eliminating computer comparison instructions within a region flow graph of computer instructions using partially resolved predicates. System apparatus 1200 includes a fully resolved predicate name generator 1210. More specifically, component 1210 is a first generator of a fully resolved predicate name of each node of a region flow graph. The fully resolved predicate name generator 1210 performs the method of action 610 in FIG. 6. The system also includes a second generator 1220 of candidate nodes to ignore that performs action 620 in FIG. 6, method 700 of FIG. 7 and method 800 in FIG. 8. Furthermore, the system 1200 includes a comparator 1230 of candidates and fully predicated named nodes to each node having a fully resolved predicate name. Comparator 1230 receives the fully predicated node names from generator 1210 and the list of nodes to ignore from generator 1220 and performs the action 630 in FIG. 6 and method 900 in FIG. 9, and creates a list of partially resolved predicate name aliases based on the differences between CDE and pseudo CDE. System 1200 also includes a selector of nodes to retain 1240. Selector 1240 is a selector of nodes of the list of candidates to retain that is received from comparator 1230. Selector 1240 performs method 1000. The selector 1240 is operably coupled to the comparator 1230.

System 1300 is an embodiment of the selector 1240 of FIG. 12. System 1300 performs the method 1000. The selector apparatus includes a first list manager 1310 for inserting a partially resolved predicate name alias indicated by a node into a list of pseudo instruction predicate names 1320, indexed by node. System 1300 also includes a second list manager 1330 for inserting a dependence edge from the branch for an immediate predecessor region exit to a list of pseudo instruction predicate names indexed by node, for each immediate predecessor region exit. The second list manager 1330 is operably coupled to the first list manager 1310 through a compare eliminator 1340. The compare eliminator 1340 receives the partially resolved predicate name alias, indexed by node, for each controlling node of the node from the first list manager, and deletes a compare instruction for the partially resolved predicate name alias.

System 1400 is an embodiment of the comparator 1230 of FIG. 12. System 1400 performs method 900.

System 1400 includes a generator 1410 of difference(s) between a list of pseudo CDEs 1420 and a list of CDEs 1430. The generator 1410 transmits the differences 1440 to an associator 1450 that associates the differences 1440 with a list of candidates for partially resolved predicate resolution 1460. The associator assigns or associates a variable representation of an immediate CDE of a node 1470 to the list of candidates 1460. A list manager 1480 assigns or associates the partially resolved predicate name alias 1490 indicated by the node to the predicate name indicated by the representation of an immediate CDE 1470,. The list manager 1480 also inserts the node into a list of partial-predicate name aliases 1490.

Components of systems 1200, 1300 and 1400, in varying embodiments, are embodied as computer hardware circuitry or as a computer-readable program, or a combination of both.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 310 in FIG. 3, or on at least as many computers as there are components.

Conclusion

An apparatus to eliminate compare instructions in computer program code using partially resolved predicated has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, although described in object-oriented terms, one of ordinary skill in the art will appreciate that the invention can be implemented in a procedural design environment or any other design environment that provides the required relationships.

Partially resolved predicates are used to reduce the number of compares generated during the prediction phase of the compiler. In a partially resolved predicate the predicate name is defined on or along the same paths as the fully resolved predicate counterpart, but it can be used to guard or qualify a subset of the instructions of the fully resolved predicate name. A partially resolved predicate is generated for predicate names which are only valid in a restricted control flow region. One or more of the control flow edges are ignored when computing control dependence. Instead of computing the complete conversion of control dependence into predicate data dependence, the predicate name relies partially on the actual ignored control flow edge to prevent incorrect usage of the predicate name.

Partially resolved predicates enable a compiler to reduce the number of compare instructions generated. Removing these compare instructions reduce critical path length and uses less functional units.

In particular, one of skill in the art will readily appreciate that the names of the methods and apparatus are not intended to limit embodiments of the invention. Furthermore, additional methods and apparatus can be added to the components, functions can be rearranged among the components, and new components to correspond to future enhancements and physical devices used in exemplary embodiments of the invention can be introduced without departing from the scope of exemplary embodiments of the invention. One of skill in the art will readily recognize that exemplary embodiments of the invention can be applicable to future communication devices, different file systems, and new data types.

The terminology used in this application with respect to is meant to include all object-oriented, database and communication environments and alternate technologies which provide the same functionality as described herein. Therefore, it is manifestly intended that this invention be limited only by the following claims and equivalents thereof.

What is claimed is:

1. A computerized method comprising:
defining in a computer program a region having nodes in a flow graph;
generating a full predicate name of each node of the region flow graph;
generating a list of candidates of nodes to ignore;
comparing the list of candidates to each node having a full predicate name, wherein a list of partial predicate name aliases is generated;
determining which node(s) of the list of candidates to retain from the list of partial predicate name aliases; and
eliminating from the computer program comparison instruction(s) for nodes not retained in the list of partial predicate name aliases.

2. The computerized method of claim 1, wherein generating the full predicate name is performed after generating the list of candidates of nodes to ignore.

3. The computerized method of claim 1, wherein generating a full predicate name further comprises, for each node within the region flow graph:
determining control dependence equivalence information of each node; and assigning a virtual predicate name to each node, wherein each control dependence equivalent node shares the same name.

4. The computerized method of claim 3, wherein determining control dependence equivalence information further comprises:

determining a dominator;

determining a post-dominator;

determining an immediate dominator;

determining an immediate post-dominator;

marking a control dependence equivalent using the immediate dominator of the node to a control dependence equivalent list of the node when the immediate post-dominator equals the node address; and marking a control dependence equivalent using the immediate dominator of the node to a control dependence equivalent list of the immediate dominator of the node when the immediate post-dominator equals the node address.

5. The computerized method of claim 4, wherein determining further comprises restoring the original region flow graph.

6. The computerized method of claim 3, wherein the assigning a virtual predicate name to each node further comprises:

assigning a predicate name to the node for each node not having a predicate name; and assigning the predicate name of the node to a predicate name of the control dependence equivalent of each control dependence equivalent node for each node not having a predicate name.

7. The computerized method of claim 1, wherein the generating a list of candidates of nodes to ignore, further comprises:

creating control dependence equivalents by removing side exits from the region; and creating a list of pseudo control dependence equivalents.

8. The computerized method of claim 7, wherein the creating control dependence equivalents by removing side exits from the region further comprises:

removing the variable denoting the exiting node from the region flow graph where a side exit of the region flow graph exists for each region exit of the region flow graph.

9. The computerized method of claim 7, wherein the creating pseudo control dependence equivalents further comprises:

determining a dominator for each node in the region flow graph;

determining a post-dominator for each node in the region flow graph;

determining an immediate dominator for each node in the region flow graph;

determining an immediate post-dominator for each node in the region flow graph;

marking a pseudo control dependence equivalent using the immediate dominator of the node to a list of pseudo control dependence equivalents of the node when the immediate post-dominator equals the node address; and marking a pseudo control dependence equivalent using the immediate dominator of the node to a pointer to a list of control dependence equivalents of the immediate dominator of the node when the immediate post-dominator equals the node address.

10. The computerized method of claim 1, wherein comparing further comprises for each node in the region flow graph:

assigning to a list of candidates for partial predicate resolution the difference between a list of pseudo control dependence equivalents and a list of control dependence equivalents;

assigning a representation of an immediate control dependence equivalent of the node to the list of candidates;

assigning to a partial predicate name alias indicated by the node, the predicate name indicated by the representation of an immediate control dependence equivalent; and inserting the node into a list of partial predicate name aliases.

11. The computerized method of claim 1, wherein determining further comprises for each profitable node in the region flow graph:

inserting a partial predicate name alias indicated by the node into a list of pseudo instruction pcopy predicate names indexed by the node;

inserting a dependence edge from the branch for the immediate predecessor region exit to the list of pseudo instruction pcopy predicate names indexed by the node, for each immediate predecessor region exit; and deleting a compare generation for the partial predicate name alias indexed by the node for each controlling node of the node.

12. A computerized method comprising:

defining in a computer program a region having nodes in a flow graph;

generating a full predicate name of each node;

generating a list of candidates of nodes to ignore;

generating a list of nodes having partial predicates by comparing the list of candidates to each node having a full predicate name; and determining which nodes of the list of nodes having partial predicates are profitable to retain;

eliminating from the region comparison instructions for those nodes that are not profitable to retain in the list of nodes.

13. The computerized method of claim 12, further comprising;

determining control dependencies based on a full flow graph;

determining control dependencies based on flow graph without any side exit edges;

comparing the result of the determinations, resulting in a plurality of differences in control dependencies;

determining the profitability of each of the differences;

renaming each profitable predicate;

guarding each profitable predicate with a branch; and removing the predicate from the guarded branch.

14. The computerized method of claim 12, further comprising:

determining control dependencies based on flow graph without any side exit edges;

comparing the result of the determinations, resulting in a plurality of differences in control dependencies;

determining the profitability of each of the differences;

guarding each profitable predicate with a branch; and removing the predicate from the guarded branch.

15. A set of computer instructions, tangibly embodied on a computer readable medium:

defining in a computer program a region having nodes in a flow graph;

generating a full predicate name of each node;

generating a list of candidates of nodes to ignore;

generating a list of nodes having partial predicates by comparing the list of candidates to each node having a full predicate name;

determining which nodes of the list of nodes having partial predicates to retain; and eliminating from the computer program comparison instructions for those nodes that are not retained in the list of node.

16. The computer instructions of claim 15, wherein generating a list of candidates of nodes to ignore further comprises:

creating control dependence equivalents by removing side exits from the region; and creating a list of pseudo control dependence equivalents.

17. The computer instructions of claim 15, wherein the comparing operation further comprises, for each node in the region flow graph:

assigning to a list of candidates for partial predicate resolution the difference between a list of pseudo control dependence equivalents and a list of control dependence equivalents;

assigning a representation of an immediate control dependence equivalent of the node to the list of candidates;

assigning to a partial predicate name alias indicated by the node, the predicate name indicated by the representation of an immediate control dependence equivalent; and inserting the node into a list of partial predicate name aliases.

18. A system comprising:

a processor;

a storage device coupled to the processor;

program code in the storage device;

software means operative on the processor to define in the program code a region having nodes in a flow graph;

to generate a list of candidates of nodes to ignore;

to compare the list of candidates to each node having a full predicate name so as to generate a list of nodes having partial predicates;

to determine which nodes of the list of candidates to retain;

to eliminate from the program code one or more comparison instructions not retained in the list of candidates.

19. The system of claim 18, wherein the means to compare further comprises means to assign to a list of candidates for partial predicate resolution the difference between a list of pseudo control dependence equivalents and a list of control dependence equivalents.

20. A computer-readable medium having computer-executable instructions to cause a computer to perform a method comprising:

generating a full predicate name of each node in a region of computer instructions;

generating a list of candidates of nodes to ignore;

generating a list of nodes having partial predicates by comparing the list of candidates to each node having a full predicate name; and determining which nodes of the list of nodes having partial predicates are profitable to retain; and eliminating compare instructions in the region for those nodes that are not profitable to retain.

21. The computer-readable medium as in claim 20, the method further comprising:

determining control dependencies based on a full flow graph;

determining control dependencies based on flow graph without any side exit edges;

comparing the result of the determinations, resulting in a plurality of differences in control dependencies; and determining the profitability of each of the differences.

22. The computer-readable medium as in claim 21, the method further comprising:

renaming each profitable predicate;

guarding each profitable predicate with a branch; and removing the definition of each predicate.

* * * * *

UNITED STATES PATENT AND TRADEMARK OFFICE
CERTIFICATE OF CORRECTION

PATENT NO. : 6,732,356 B1
DATED : May 4, 2004
INVENTOR(S) : Chen

It is certified that error appears in the above-identified patent and that said Letters Patent is hereby corrected as shown below:

<u>Title page, Item [54] and Column 1, line 4,</u>
Title, delete "INSTRUCTION" and insert -- INSTRUCTIONS --, therefor.

<u>Title page,</u>
Item [56], References Cited, OTHER PUBLICATIONS, first reference, delete "Hewlettl-Packard" and insert -- Hewlett-Packard --, therefor and delete "retiieved" and insert -- retrieved --, therefor.

Signed and Sealed this

Sixth Day of July, 2004

JON W. DUDAS
*Acting Director of the United States Patent and Trademark Office*